United States Patent [19]

Hoffman

[11] Patent Number: 4,915,351

[45] Date of Patent: Apr. 10, 1990

[54] HOSE COUPLING VALVE

[76] Inventor: Albert R. Hoffman, 14255 Terry Trails, Grand Haven, Mich. 49417

[21] Appl. No.: 374,053

[22] Filed: Jun. 30, 1989

[51] Int. Cl.$^4$ .............................................. F16L 37/28
[52] U.S. Cl. ................................................ 251/149.1
[58] Field of Search ...................... 251/149.1; 604/245, 604/246, 249

[56] References Cited

U.S. PATENT DOCUMENTS

| | | | |
|---|---|---|---|
| 1,092,673 | 4/1914 | Stephens | 251/149 |
| 2,099,335 | 11/1937 | Hansen | 284/19 |
| 2,344,740 | 3/1944 | Shaff | 285/169 |
| 2,377,812 | 6/1945 | Scheiwer | 285/169 |
| 4,143,853 | 3/1979 | Abramson | 251/149.1 |
| 4,167,204 | 9/1979 | Zeyra | 251/149.1 |
| 4,564,132 | 1/1986 | Lloyd-Davies | 222/522 |
| 4,683,916 | 8/1987 | Raines | 251/149.1 |
| 4,712,583 | 12/1987 | Pelmulder et al. | 604/247 |

FOREIGN PATENT DOCUMENTS 636557 3/1962 Italy .

Primary Examiner—A. Michael Chambers
Attorney, Agent, or Firm—Price, Heneveld, Cooper, DeWitt & Litton

[57] ABSTRACT

A quick disconnect garden hose coupling of first and second bodies with a quick disconnect connection therebetween and having fluid flow passageways, the first body having an axial projection with laterally oriented flow openings and a projecting abutment surface extending into the second body past an annular shoulder therein when the bodies are coupled, a resilient stretchable gasket disc on this shoulder, having a peripheral portion engaged and sealingly secured against the shoulder by the end of a connected hose or the like, having an imperforate central portion, and having orifices spaced radially outwardly of the imperforate portions, radially inwardly of the peripheral portion and axially aligned with the shoulder to allow closure of these openings against the shoulder when the bodies are disconnected and, when the bodies are connected, cause opening of the openings by stretching distortion of the gasket disc.

5 Claims, 1 Drawing Sheet

HOSE COUPLING VALVE

BACKGROUND OF THE INVENTION

This invention relates to quick disconnect couplings for garden hoses, and more particularly to a quick disconnect hose coupling and shutoff valve.

Coupling devices to quickly connect and disconnect garden hoses and garden hose attachments such as sprinklers and nozzles have been known and marketed for some time. The term "hose attachment(s)", when used herein, is intended to mean sprinklers, nozzles, and similar components commonly attached to garden hoses. These coupling devices are usually made of plastic, and sometimes incorporate a valve mechanism to stop water flow in the uncoupled condition. Such a mechanism is complex. Better quality coupling devices made of brass and stainless steel provide a product that is more durable, but they typically do not have mechanism to stop water flow. The one known brass connector that does stop water flow when uncoupled is basically a duplication of the complex mechanism found in plastic units, and is very expensive to manufacture. Consequently, brass couplers for the lawn and garden industry are typically made without the water stop feature.

As to the couplers that do have a flow shutoff, virtually all known designs use the same concept. A separate floating valve element on the inside of the unit is forced away from its seat by the insertion of the mating coupler half, thus allowing water flow. When the two halves are disconnected, either water pressure or spring pressure forces the element back to its seat, stopping water flow. Although the location and configuration of these internal components vary between manufacturers, the principle of operation is virtually identical. They are all traditional spring-disc valves. The length of the valve itself and the length of its travel from one end of its motion to the other, require that the body of the valve must be lengthened to accommodate the internal components. This is of critical cost importance when it is made of brass.

In addition to the complexity and number of the internal components of presently known couplers, this traditional design also still requires a separate hose washer to seal the connection with the attached hose or hose attachment.

SUMMARY OF THE INVENTION

The present invention constitutes a unique quick connect hose coupler and valve of fewer components and lower cost, enabling practical manufacture of brass or stainless steel quick disconnect couplings with water flow shutoff during disconnect. A single flexible gasket disc serves both as a hose washer and the shutoff valve. Thus, the gasket disc, acting as a hose washer, provides a seal between the mating surfaces of the male and female threaded components, eliminating the need for a separate hose washer. The gasket disc also functions as a valve that prevents water flow from the pressurized side of the garden hose when the two elements of the coupling are disconnected. When the two elements are reconnected, the center section of the gasket disc stretches while the periphery is held fixed by the hose connection, increasing the size of special flow slots therein to maximize water flow.

The decrease in overall length of the coupling made possible by the elimination of internal components and of space required for the prior art devices makes its manufacture from brass more economical. In fact, the length of this novel structure is the same as the conventional brass coupler without water flow control. Thus, the hose connector valve has quick disconnect and shutoff valve features, but still of a length directly comparable to the length of a standard quick disconnect coupling. The components added for the plural function character are not complex, comprising an extended orificed actuator portion on one coupling body, and a special resilient, stretchable combination valve and washer gasket disc usually of rubber, in the other body.

These and other objects, advantages and features of this invention will become apparent upon studying the following detailed specification in conjunction with the drawings.

DESCRIPTION OF THE PREFERRED EMBODIMENT

Figure 1:
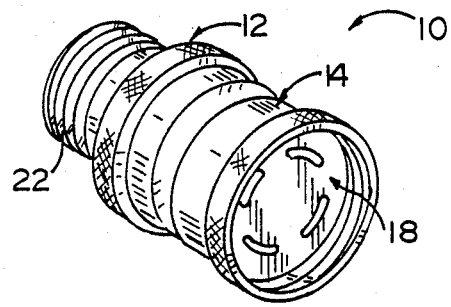
FIG. 1 is a perspective view of the novel hose coupling valve.
Figure 2:
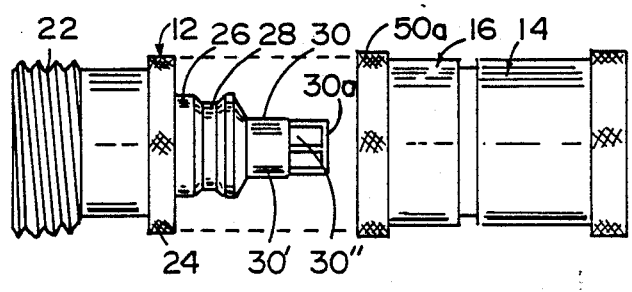
FIG. 2 is an exploded view of the components of the valve in FIG. 1, as uncoupled.
Figure 3:
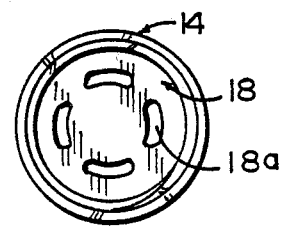
FIG. 3 is an end elevational view of the right end of the coupling in FIG. 2.

Referring now specifically to the drawings, the hose coupling valve 10 comprises four main components, namely the male body 12, the female body 14, the quick connect detent collar 16 and the stretchable, resilient valve disc 18.

The male body 12 is axially elongated, having a central axis about which it is symmetrical, including an axial passageway 20 therein having an outer axial end opening 20'. On this end of the male body are external male hose threads 22 to interfit with a conventional female coupling of a hose or a hose attachment. Toward the other end is a quick disconnect mechanism. An integral, knurled, peripheral surface 24 makes manual connection of the two components easier. Toward the second end is a reduced diameter cylindrical portion 26 having an annular detent groove 28 therein, and a further reduced diameter cylindrical portion 30 which has a peripheral cylindrical surface 30', a plurality of radially oriented openings 30" adjacent the end, and an end abutment surface 30a for engaging the central imperforate portion of the rubber disc in a manner to be described hereinafter. This end abutment surface is shown as an annular surface around a central axial opening. However, this axial opening could be closed off since flow does not occur through it.

Figure 6:
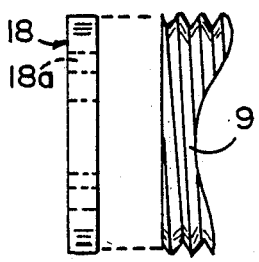
FIG. 6 is a side elevational view of the valve element and a fragmentary end of a hose or faucet.
Figure 7:
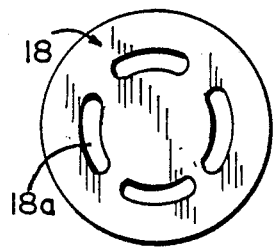
FIG. 7 is an end elevational view of the valve element.

The female body 14 is an axially elongated element having a central axis about which the body is symmetrical. It has an axial passageway 36 therethrough including an outer axial end opening 36'. The outer end portion of this passageway is formed by a radially enlarged recess which has female hose threads 38 on its circumference to interfit with the conventional male hose threads of a standard hose or faucet 9 (FIG. 6). The bottom inner end of the recess comprises a transverse annular shoulder 40. Around the periphery of the outer end is a knurled integral ring 42 for manual gripping during connection of the hose to the female member.

Around the inner end of female member 14 is movable collar 16. It comprises a cylindrical ring 50 slidable along a cylindrical guide surface 44, the outer diameter of surface 44 being comparable in size to the inner diameter of collar ring 50. The collar ring is retained on female body 14 by a suitable snap ring 52 abutting against a small flange 44' of cylinder portion 44 in conventional fashion.

Cylinder portion 44 also has a plurality of radially extending round openings 44a extending therethrough and receiving a plurality of spherical detent balls 60. These detent balls engage the walls of an annular detent groove 28 in the male member to secure the coupling together by an interference fit in conventional fashion. Collar 50 is movable axially on female member 14 between a first position (FIG. 4) wherein the balls are prevented from moving radially fully out of detent groove 28 to maintain the coupling, and a second position against the bias of a compression coil spring 56 around member 44 and trapped between collar 50 and female body 14. In the second position, collar 50 releases balls 60 radially outwardly from groove 28 to allow disconnection or reconnection of the coupling components.

In the coupled condition, the further reduced diameter projection 30 of male member 12 fits into a reduced diameter central opening or passage 46 in female member 14. An annular seal such as an O-ring 64 is retained in an annular groove of the female member 14 and engages the projection 30. The projection extends sufficiently far into the female member to cause orifices 30" to project into the recess 36 of the female member to be exposed. This extension also causes abutment surface 30a to extend past shoulder 40 a significant amount, preferably about one-eighth inch or so, to cause distortional contact with the imperforate central portion of otherwise planar resilient disc valve 18.

Figure 4:
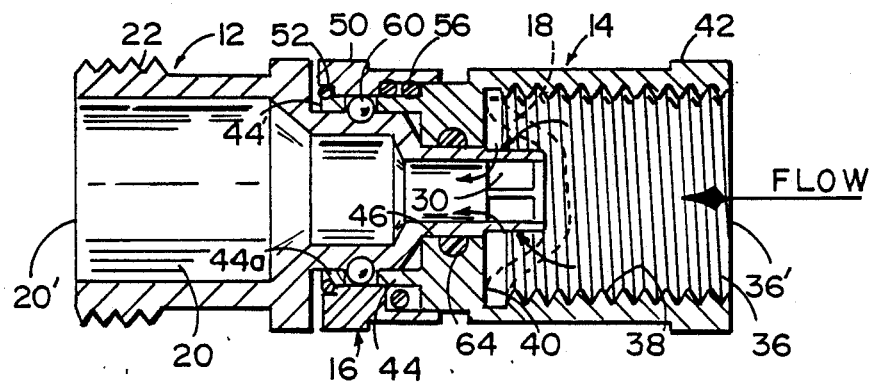
FIG. 4 is a cross sectional elevational view of the coupling valve in FIG. 1 in its coupled condition, showing the valve element in phantom.
Figure 5:
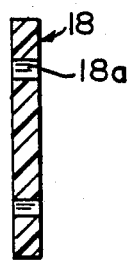
FIG. 5 is a cross sectional view of the valve element.

This disc 18 is of a stretchable, resilient material such as rubber or equivalent polymer which can be stretched by engagement of abutment surface 30a with the imperforate center of the disc to distort it to a convex configuration generally like that depicted in phantom in FIG. 4, while held at its outer peripheral portion against shoulder 40 by the inner annular end of a male hose connector or faucet (not shown). The outer edge portion of the disc thus serves as a sealing gasket for the hose or faucet, while the hose or faucet serves to hold the disc in place. In its flat or planar condition, disc 18 appears as shown in FIG. 6. It includes a plurality, here shown to be four, of accurate openings 18a therethrough, spaced from each other in a circle, located radially outside of the imperforate central portion of the disc engaged by abutment surface 30a, and radially inward of the outer portion engaged by the inner end of the male hose connector. They are axially aligned with shoulder 40 to be closed thereby. Coupling of the two components, therefore, causes abutment surface 30a to distend the planar disc to the convex configuration. This also stretches openings 18a to a larger size for maximizing flow therethrough.

Hence, when male member 12 is connected to a hose or hose attachment and female member 14 is connected to a hose or faucet, and the two bodies are coupled together in the manner depicted in FIG. 4, valve disc 18 will serve as the gasket for the hose or faucet interconnection with female member 14 and will also constitute a flow control valve. It is opened due to the stretching action of projection 30 against the valve, moving orifices 18a away from shoulder 40 and also stretching the orifices to a larger size for maximizing flow in the direction indicated by the arrows in FIG. 4. When the male and female coupling bodies are disconnected by pulling collar 50 against its compression spring 56 thereby releasing detent balls 60 from detent groove 28, the coupling is disconnected or decoupled. When this occurs, the fluid flow pressure entering recess 36 of member 14 will combine with the inherent resilience of valve member 18 to return it to its planar condition. This reduces the size of flow openings 18a and also causes them to be closed off against shoulder 40 to stop the flow. It also causes the imperforate central portion of the disc to cover central flow passage or opening 46 and thereby sealingly close it.

Those skilled in this art, after studying this disclosure, will note the very simplicity of the arrangement wherein the valve body 18 serves both as the gasket and as the control valve, in cooperation with projection 30. The simplicity renders the unit economical even when made of brass or stainless steel. The overall length is directly comparable to that of a conventional quick disconnect coupler without valving characteristics.

Additional features and advantages of the invention may well occur to those in the art upon studying this disclosure, as well as certain modifications of this preferred embodiment set forth as illustrative of the inventive concept. It is intended that the invention is to be limited only by the scope of the appended claims and the reasonable equivalents thereto, rather than to this illustrative embodiment.

The embodiments of the invention in which an exclusive property or privilege is claimed are defined as follows:

1. A hose coupling comprising:
   a first hollow generally cylindrical body having a central passage for fluid flow therethrough, and first and second ends;
   hose connector male threads on the outer periphery of said first end for connection to female threads of a hose;
   said second end having a reduced diameter portion and a further reduced diameter projection;
   said reduced diameter portion having a peripheral detent means for quick disconnect coupling to a second generally cylindrical body;
   said further reduced diameter projection having an axial abutment end and having a lateral passage communicating with said central passage;
   a second hollow, generally cylindrical body having a central passage, and first and second ends;
   said second end having female threads on the inner periphery thereof for connection to male threads of a hose or faucet;
   a spring biased detent collar around and retained on said first end of said second body, having means for engaging said detent means on said first body for quick connect and disconnect coupling of said bodies;
   said first end of said second body having a cylindrical guide surface;
   a cylindrical passage in said cylindrical guide surface having an internal diameter matching the diameter of said further reduced diameter projection to receive such, and an annular seal in said cylindrical passage to form a seal between said first and second bodies;

said second body having an annular transverse shoulder between said female threads and said cylindrical passage;

said further reduced diameter projection of said first body extending into said second body sufficiently to protrude beyond said shoulder;

a combination washer and valve disc of a resilient deformable material, said disc being on said annular shoulder positioned to have its outer portion sealingly pressed against said shoulder by the annular end of a hose or faucet male fitting connected to said second body female threads;

the central portion of said disc being engaged by said abutment end of said first body to deform said disc;

said central portion being imperforate; and said disc having orifices radially between its said central portion and its said outer portion but aligned with said shoulder, whereby when said first and second bodies are connected, and said abutment end engages said disc, it will deform said disc and shift said orifices away from said shoulder and enlarge said orifices for flow therethrough, and when said first and second bodies are disconnected, fluid pressure will assist the inherent resiliency of said disc to shift said disc fully against said shoulder to stop fluid flow through said disc orifices and to shift said central imperforate disc portion over said cylindrical passage to close off said cylindrical passage.

2. The hose connector in claim 1 wherein said disc is stretched by said abutment end, and said orifices are enlarged during the stretching action of said disc for maximizing flow therethrough.

3. A quick disconnect garden hose coupling comprising:

first and second bodies, said first body having a portion fitting within said second body, a quick disconnect connection between said bodies, and both of said bodies having fluid flow passageways;

said first body having an axial projection with laterally oriented flow openings and a projecting abutment surface;

said second body having an inner transverse annular shoulder;

said projection and said flow openings extending into said second body past said annular shoulder when said bodies are coupled;

a resilient flexible gasket disc on said shoulder, having a peripheral portion to be engaged and sealingly secured against said shoulder by the end of a connected hose or faucet, having orifices spaced radially outwardly of said abutment surface and radially inwardly of said peripheral portion and axially aligned with said shoulder to allow closure of said openings against said shoulder when said bodies are disconnected and, when said bodies are connected, cause opening of said openings by distortion of said gasket disc including the portion containing said openings by said abutment surface.

4. The coupling in claim 3 wherein said second body has a passage portion adjacent said shoulder and axially toward said first body, said passage portion having an interior peripheral surface configurated like the peripheral exterior surface of said projection to interfit therewith, and an annular seal between said peripheral surfaces.

5. The coupling in claim 3 wherein said annular shoulder surrounds an axial flow passage, and said disc has an imperforate central portion engaged by said abutment surface, and said central portion closes off said axial flow passage when said bodies are disconnected.

* * * * *